United States Patent [19]

Yamamoto et al.

[11] Patent Number: 5,245,438
[45] Date of Patent: Sep. 14, 1993

[54] IMAGE FORMATION APPARATUS HAVING SELECTIVE ERASING CAPABILITY

[75] Inventors: Yoichi Yamamoto, Nara; Masao Narumiya, Shiki; Hirokazu Fujita, Nara, all of Japan

[73] Assignee: Sharp Kabushiki Kaisha, Osaka, Japan

[21] Appl. No.: 750,876

[22] Filed: Aug. 26, 1991

[30] Foreign Application Priority Data

Aug. 27, 1990 [JP] Japan .................................. 2-227067
Sep. 29, 1990 [JP] Japan .................................. 2-262056
Jun. 28, 1991 [JP] Japan .................................. 3-159043

[51] Int. Cl.⁵ .......................... B41J 2/445; G02F 1/13
[52] U.S. Cl. ..................................... 358/296; 358/302; 346/107 R; 346/108; 359/45; 359/53
[58] Field of Search ......................... 358/296, 302, 300; 346/108, 107 R, 160; 340/784, 765; 359/43, 45, 48, 53

[56] References Cited

U.S. PATENT DOCUMENTS 4,733,275 3/1988 Sugiura .................................. 358/300
4,810,064 3/1989 Azusawa .................................. 359/45

FOREIGN PATENT DOCUMENTS 0167398 1/1986 European Pat. Off. .
0291300 11/1988 European Pat. Off. .
57-177125 10/1982 Japan .
60-035376 2/1985 Japan .
61-292236 12/1986 Japan .
20773 1/1989 Japan .
2218533 11/1989 United Kingdom .

Primary Examiner—Edward L. Coles, Sr.
Assistant Examiner—Scott A. Rogers
Attorney, Agent, or Firm—David G. Conlin; George W. Neuner

[57] ABSTRACT

An image formation apparatus includes a writing device for selectively writing image data on a liquid crystal cell by beam light, a printer for printing out an image on a recording medium, an erasing device for erasing the image written on the liquid crystal cell by a beam of light from a specified region, and a controller for controlling the writing device for writing a novel image in the region from which the previously written image has been erased.

4 Claims, 16 Drawing Sheets

IMAGE FORMATION APPARATUS HAVING SELECTIVE ERASING CAPABILITY

BACKGROUND OF THE INVENTION

1. Field of the Invention

The present invention relates to an image formation apparatus of storing image data in an optical image memory by beam light, reading the stored image and printing it out.

2. Description of the Prior Art

U.S. Pat. No. 3,796,999 discloses a display in which laser light selectively illuminates a liquid crystal cell and liquid crystal makes an image visible. In this display, heat of the laser light is utilized to partially vary a phase of the liquid crystal; the image is formed in accordance with an irradiation pattern of the laser light. The liquid crystal employed may be a smectic liquid crystal, for example.

Also, Japanese Unexamined Patent Publication No. 20773/1989 discloses a device using the above-mentioned thermal writing liquid crystal cells for forming an image irradiating a light transmitted or reflected by the liquid crystal to a photosensitive material, a latent image is formed on the photosensitive material; the latent image is used to make an image. With three liquid crystal cells, for example, images of primary colors, R(red), G(green) and B(blue), are written in the cells, and a full color image is composed of the three images.

However, in such a conventional image formation device, if it is necessary to partially change an image written in liquid crystal cells, partial erasing and writing of the image on one of the liquid crystal cells is impossible; therefore, it is necessary to erase all the image and then write a novel image. Then, there arises the problem that it requires long time to perform the writing.

SUMMARY OF THE INVENTION

The present invention provides an image formation device comprising writing means for selectively writing image data on a liquid crystal cell by a beam of light, a printer for printing out an image on a recording medium, erasing means for erasing the image written on the liquid crystal cell by beam light from a specified region, and control means for controlling the writing means for writing a novel image in the region from which the previously written image has been erased.

Furthermore, the present invention provides an image formation device comprising an optical image memory capable of storing image data which is optically recognizable and can be repetitively read, writing means for writing image data in the optical image memory by a beam of light, confirming means for confirming where the image data written by the writing means is in the optical image memory, erasing means for erasing at least a part of the image data already written, and control means for controlling the writing means for writing the image data erased by the erasing means once more in the optical image memory.

Preferably, the optical image memory is composed of at least a single liquid crystal cell which can store image data in bits, while the erasing means is composed of voltage applying means for applying voltage to the liquid crystal cell so that only the image data which corresponds to a single scanning line, including the data in the position confirmed by the confirming means, may be erased from the liquid crystal cell.

Also, the present invention provides an image formation device comprising an optical image memory capable of storing image data which is optically recognizable and can be repetitively read, writing means for writing image data in the optical image memory by a beam of light, error detecting means for detecting an error caused while the writing means is working, confirming means for confirming where the image data is written in the optical image memory by the writing means when the detecting means detects the error, erasing means for erasing at least a part of the image data written as far as the position confirmed by the confirming means, and control means for stopping the operation of the writing means when the error detecting means detects the error and for controlling the writing means so that the image data erased by the erasing means may be written once more in the optical image memory.

Preferably, the optical image memory is composed of a plurality of liquid crystal cells which can store image data in bits, while the erasing means is composed of voltage applying means for applying voltage to the liquid crystal cells so that only the image data which corresponds to a single scanning line, including the data in the position confirmed by the confirming means, may be erased from the liquid crystal cells in which image data is being written when the error is detected.

DETAILED DESCRIPTION OF THE PREFERRED EMBODIMENT

Embodiment 1

Figure 4:
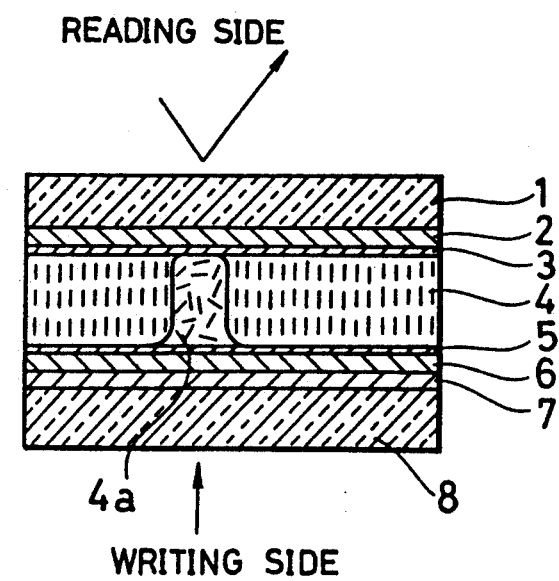
FIG. 4 is a sectional view showing the liquid crystal cell.

FIG. 4 shows a sectional configuration of a liquid crystal cell in which an image data is written by laser light.

The liquid crystal cell is written from the lower side in the drawing while it is read from the upper side. It includes a glass subtrate 1, a transparent electrode 2, a matching layer 3, a liquid crystal layer 4, a matching layer 5, a reflective layer 6 serving as an electrode, a heat absorbing layer 7 and a glass substrate 8 in the order from the top to the downward. The liquid crystal employed is a smectic liquid crystal, which is transparent in the ordinary state. When laser light illuminates the liquid crystal cell from its lower side, the heat absorbing layer 7 absorbs the light and generates heat, and in response to it, the liquid crystal layer 4 partially changes in phase (4a). Because of the phase change, part of the liquid crystal layer becomes cloudy (opaque), where light directed from the upper side is absorbed and irregularly reflected. On the other hand, the light is transmitted by the liquid crystal layer 4 in a part which remains uncloudy (transparent), and the transmitted light is reflected by the reflective layer 6 serving as an electrode; and consequently, there arises a contrast of light between the cloudy and uncloudy parts. The contrast is read out as an image. When the image is to be erased, voltage may be applied between the transparent electrode 2 and the reflective layer 6. Since the transparent electrode 2 is divided into portions as mentioned later, it is possible to partially erase the image.

Figure 5:
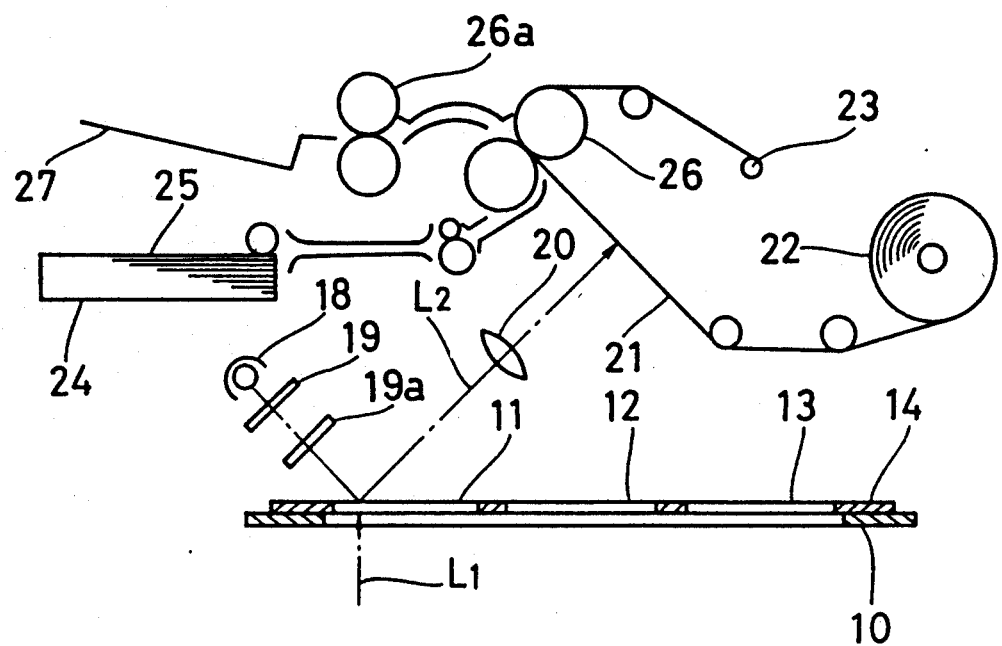
FIG. 5 is a diagram for explaining a structure of a major portion of a printer.
Figure 6:
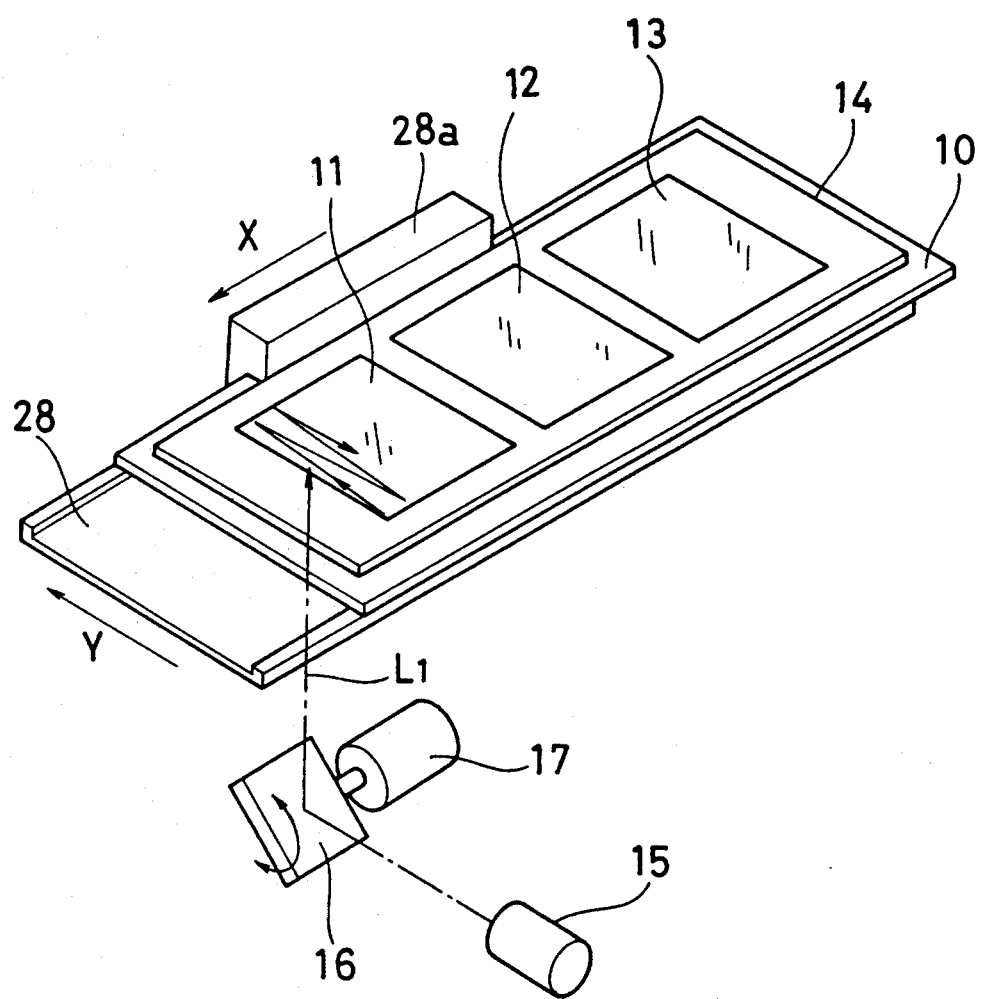
FIG. 6 is a perspective view showing a major portion of FIG. 5.
Figure 7:
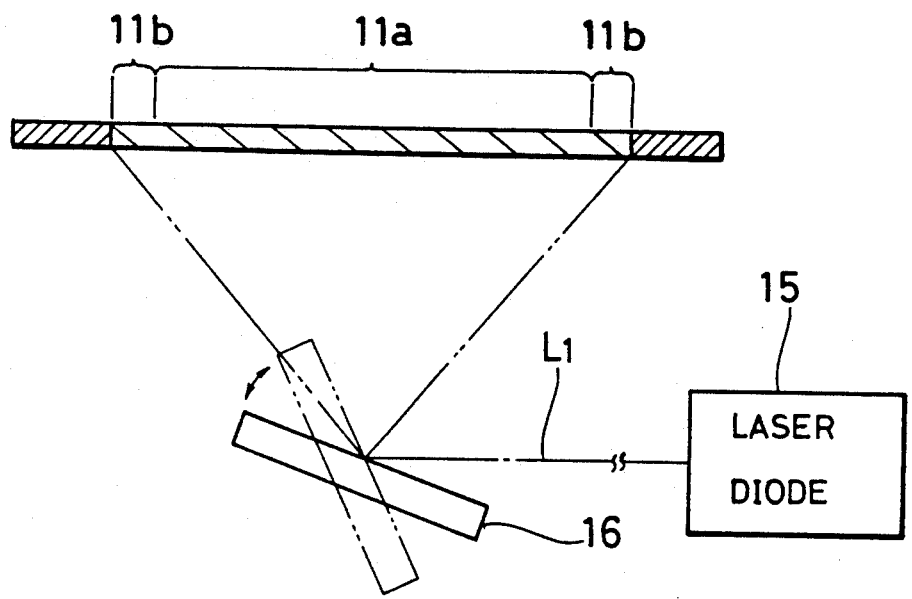
FIG. 7 is a sectional side view showing a major portion of FIG. 6.
Figure 8:
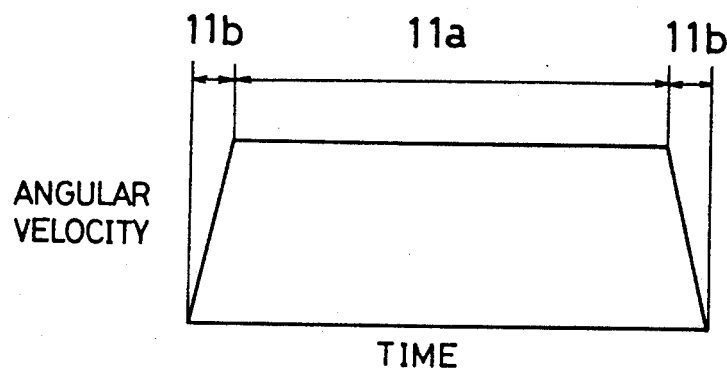
FIG. 8 is a diagram for explaining a rotation speed of a mirror in writing an image.

FIGS. 5 to 7 show configurations of major portions of a full color printer in which the above-mentioned liquid crystal cell is employed. Referring to the drawings, three liquid crystal cells 11, 12, 13 are fit in a frame 14, which is supported by a liquid crystal supporter 10. The liquid crystal supporter 10 is held by an X-axis direction moving mechanism 28 and can be moved in an X-axis direction. The movement is accurately carried out by a linear encoder motor (a linear motor combined with a linear encoder) 28. An Y-axis direction corresponds to a direction of a scanning line of laser light L1 mentioned below. Below the liquid crystal supporter 10, a writing device including a laser diode 15, a mirror 16 and a rotary encoder motor (a motor combined with a rotary encoder) 17 is placed. FIG. 7 shows a cross-section of a liquid crystal cell of FIG. 6 seen from its left side. The mirror 16 reciprocally pivots between a solid line and a dash-two-dot line by the motor 17 (FIG. 6). This allows the laser light L1 from the laser diode 15 to linearly scan the liquid crystal cell 11 to make an image in an image formation region 11a in the center. Opposite ends of the image formation region 11a are approach and overrun regions. Specifically, when the mirror 16 pivots reciprocally, an angular velocity of the mirror 16 becomes lower at the beginning of the pivotal movement and during a halt (while it makes a U-turn), as shown in FIG. 8. This is why the approach and overrun regions are provided at the opposite ends. In writing an image, if the mirror 16 reciprocally pivots while the supporter 10 is being moved in the X-axis direction (the direction of arrow),laser light scans the liquid crystal cell in the Y-axis direction as shown by an arrow in FIG. 6 to draw an image.

As can be seen in FIG. 5, on the liquid crystal supporter 10, a reading device including a lamp 18 for a light source, a color separating filter 19, a shutter 19a, and a lens 20 is placed. The lamp 18 for a light source may be, for example, a halogen lamp. Each time the liquid crystal supporter 10 moves in the X-axis direction (FIG. 6) and each of the liquid crystal cells reaches a specified position, the shutter 19a opens and the liquid crystal cells 11 to 13 are planarly scanned, and reflected light L2 from them is led through a lens 20 to a photosensitive material 21. In the liquid crystal cells 11 to 13, images of R (red), G (green) and B (blue) are written. The color separating filter 19 selectively transmits light of specific colors; for example, there are three filters: an R filter transmitting wavelength of red, a G filter transmitting wavelength of green and a B filter transmitting wavelength of blue. The filter 19 switches to the R filter transmitting the wavelength of red when the liquid crystal cell having an R image, to the G filter transmitting the wavelength of green when the liquid crystal cell having a G image, or to the B filter transmitting the wavelength of blue. The R, G and B filters are attached onto a disc rotated by a motor (not shown), and a specified filter can be positioned on an optical axis of the lamp 18. In the initial state, the R filter is positioned on the optical axis of the lamp 18. The shutter 19a is also formed of a disc having an opening which is rotated by a motor (not shown), and the opening and closing of the shutter 19a is detected through a slit engraved on the disc.

The photosensitive material 21 may be a full color type photosensitive and pressure sensitive sheet disclosed in Japanese Unexamined patent publication No. 30537/1984, which is coated with three kinds of micro capsules uniformly dispersed: ① micro capsules loaded with a photo-hardening material sensitive to a red light and dye developing cyanogen, ② micro capsules loaded with a photo-hardening material sensitive to a green light and dye developing Magenta and ③ micro capsules loaded with a photo-hardening material sensitive to a blue light and dye developing yellow. The photosensitive and pressure sensitive sheet makes a roll wound around a supply axis 22 and is sent from the supply axis 22 to a take-up axis 23 when an image is formed. While being sent, the sheet is exposed to the lights of the specific colors through the color separation filter 19 and the liquid crystal cells 11 to 13. The reflected lights of the R, G and B images on the liquid crystal cells are projected overlapped with each other in the identical part of the photosensitive material 21. Thus, on the photosensitive material 21, the above-mentioned micro capsules ① to ③ are hardened on the same plane to form a full color latent image. To the latent image, an image receiving sheet 25 held in a sheet cassette 24 is supplied; with one of the sheets overlaid with the other, both the sheets are pressed by a pressing roller 26. This causes microcapsules which are not exposed to light (a region including those capsules is identified with the region having the opaque liquid crystal) are crashed, and the dye in the capsules flows out and develops an image on the image receiving sheet 25. While generally the image receiving sheet 25 is coated with developer for making the dye loaded in the micro capsules develop color, the photosensitive material 21 may be coated with it in its surface (see Japanese Unexamined Patent publication No. 88739/1983). Printing is performed in the manner set forth above. The image receiving sheet 25 on which the image has been formed is subjected to a heat treatment by a heating roller 26a, and then it is discharged into a paper tray 27.

Figure 1:
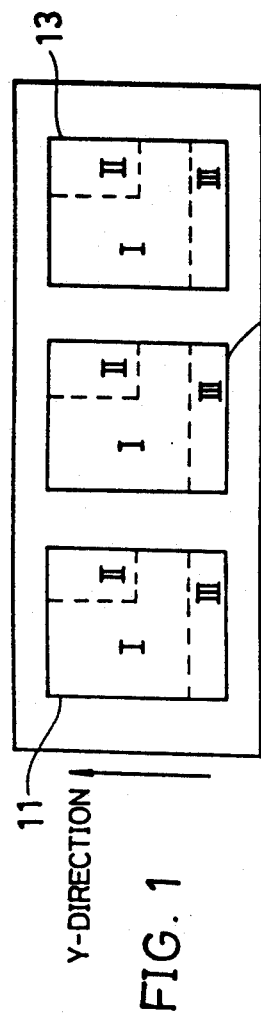
FIG. 1 is a plan view showing partially erasable regions of a liquid crystal cell.

Now the region to be erased in the liquid crystal cell according to the present invention will be explained. The three liquid crystal cells 11, 12 and 13 on which the R, G and B images are written have their respective transparent electrodes 2 (see FIG. 4) divided into regions I, II and III, respectively, as shown in FIG. 1, and X-direction and Y-direction addresses in each of the divided regions are known in advance.

Figure 2:
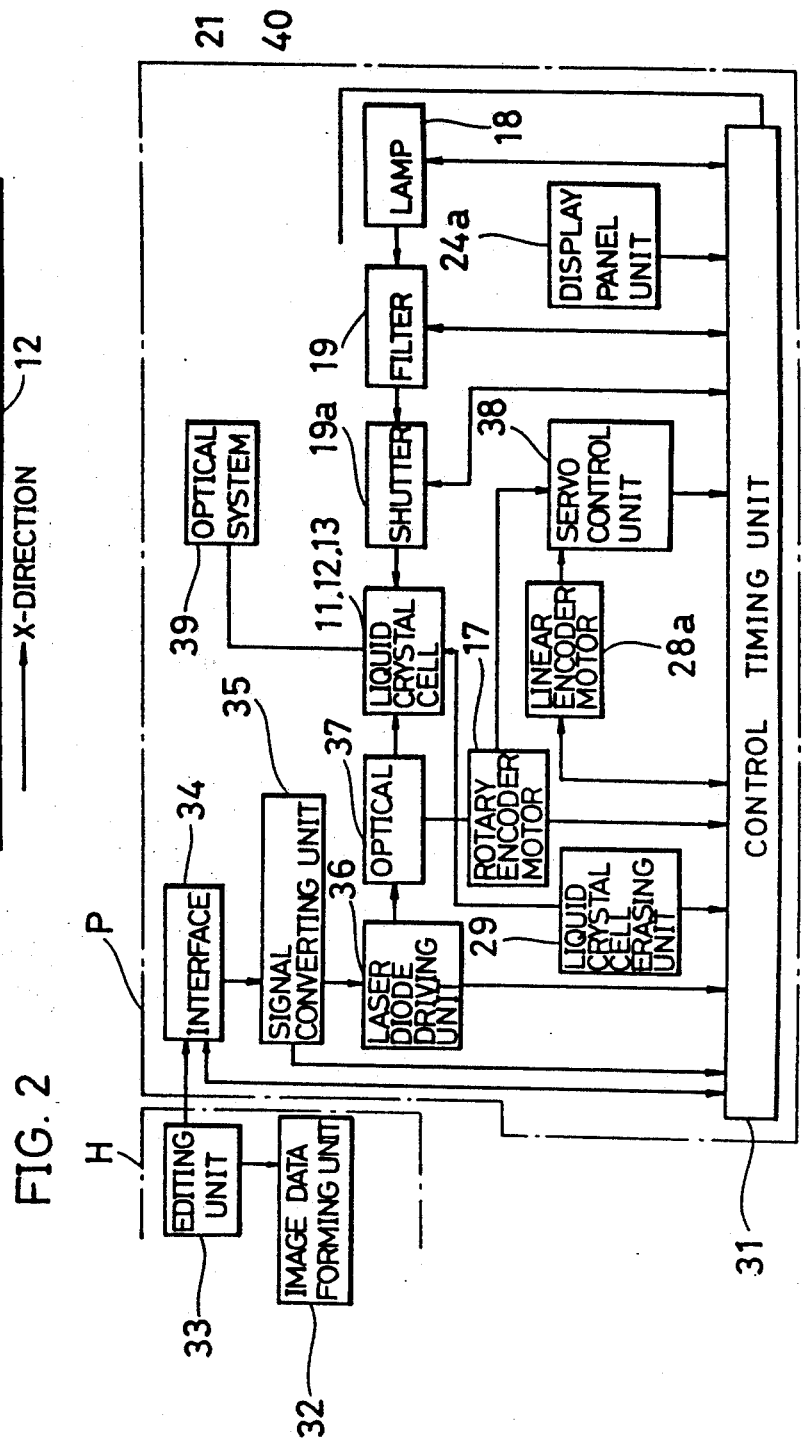
FIG. 2 is a block diagram showing a system of an embodiment according to the present invention.

FIG. 2 is a block diagram showing an image formation system. In FIG. 2, the image formation system is composed of a host computer H serving as an image data formation device and a printer P, and each component of the printer P is controlled by a control/timing unit 31. The control/timing unit 31 receives an input signal from an operating unit (not shown) and position detecting data from the rotary encoder motor 17 and a linear encoder motor 28a to make each component operate.

The host computer H has an image data formation unit 32 and an editing unit 33 for editing image data. An 8 bit image data from the editing unit 33 is received through an interface 34 to a signal converting unit 35. The signal converting unit 35 makes a D/A conversion of the image data to output it at a timing specified by the control/timing unit 31. A laser diode driving unit 36 drive the laser diode 15 (FIG. 6) through modulation in accordance with the image data. An optical system 37 utilizes the mirror 16 to guide the laser light L1 from the laser diode 15 to the liquid crystal cells 11, 12 and 13; an optical system 39 utilizes the lens 10 to image the reflected light L2 from the liquid crystal cells 11, 12 and 13 exposed to light of the lamp 18, and an image outputting unit 40 supplies the photosensitive material 21 and the image receiving sheet 25, presses both of them, thereafter heats them, and discharges them. A servo control unit 38 receives an signal from the control/timing unit 31 to drive the rotary encoder motor 17 and the linear encoder motor 28a.

When an image is written in the liquid crystal cells, the rotary encoder motor 17 and the linear encoder motor 28a are driven. Then, when the images are read out from the liquid crystal cells, the liquid crystal cells are moved in the X-axis direction by the linear encoder motor 28a to register the center of the image written on each liquid crystal cell with the center of prearranged image formation position on the photosensitive material 21. An erasing unit 29 selectively erases the regions I, II and III in the liquid crystal cells. Reference numeral 24a designates a display panel.

Figure 3:
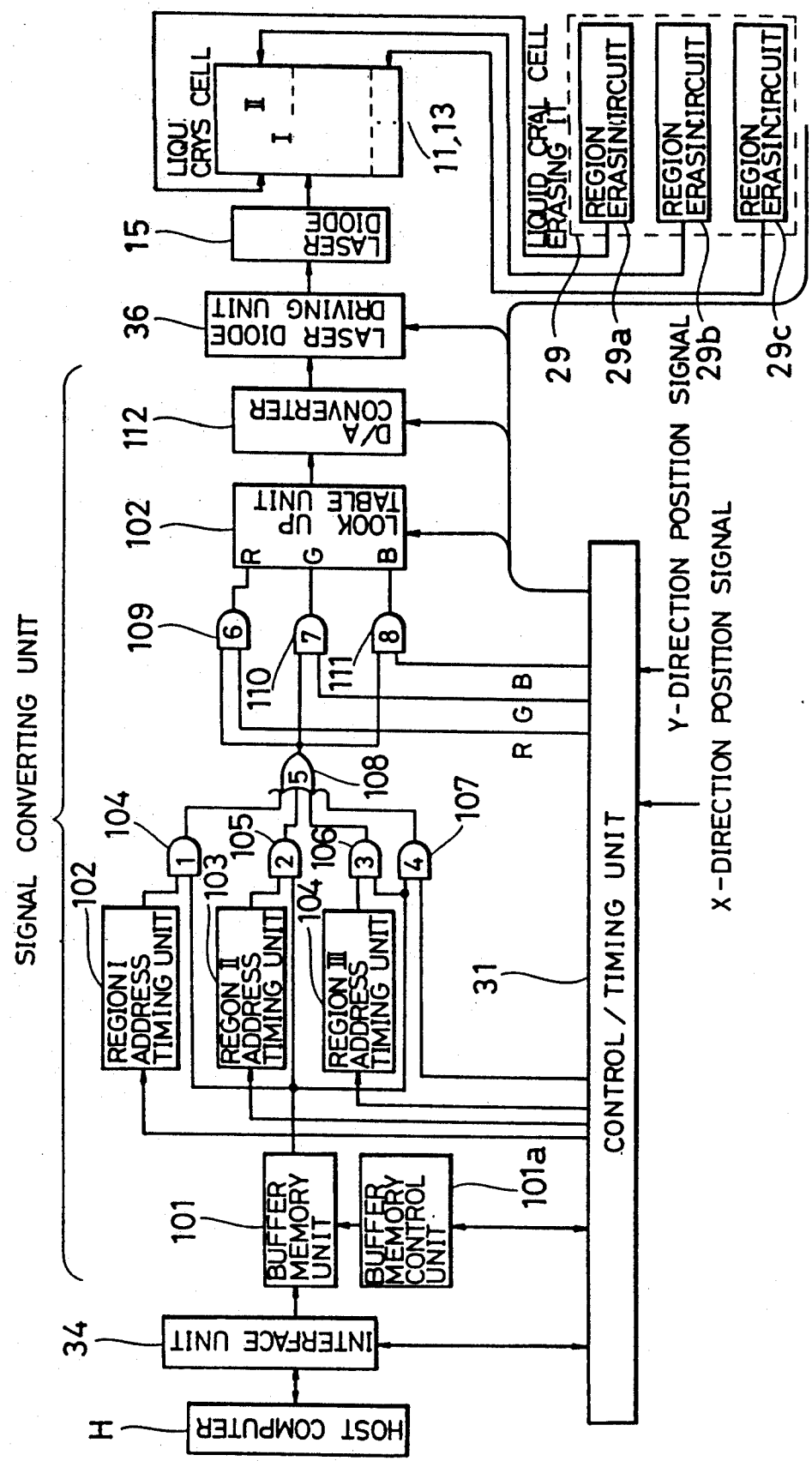
FIG. 3 is a block diagram showing a major portion of FIG. 2 in detail.

FIG. 3 is a block diagram showing a signal converting unit in FIG. 2 in detail. Referring to FIG. 3, the interface unit 34 is a part for controlling an application and a reception of signals to and from the host computer H, and it may be an SCSI interface, for example.

Data inputted and outputted to and from the interface 34 is 8 bit data. Image data from the host computer H arrives in the order of R, G and B. A buffer memory 101 is required because a speed for transmitting a signal from the host computer H and a speed for writing the image data in the liquid crystal cells are different. For example, employing a dual-port memory of 32 Kbyte (32×8 bit), data from the host computer H is written in the memory simultaneous with reading data to be inputted to an LUT (Look-Up Table) unit 102.

Data is read from the buffer memory 101 in different directions in odd and even lines, because as will be seen from the method of writing in the liquid crystal cells in FIG. 6, data is written in odd and even lines in reverse directions to each other. Such writing and reading directions are controlled by a buffer memory control unit 101a. A Region I address timing unit 102 outputs a signal when a data signal from the buffer memory 101 is the data to be written in the region I. Then, the data signal passes to an AND gate 104 and an OR gate 108, and it further passes to an AND gate 109 if the data is the R data to be applied to the look-up table unit 102.

Such is the case for address timing units 103, 104 of the regions II, III. When data must be written not in any specific region but throughout the liquid crystal cell, the address timing units 102, 103, 104 of the regions I, II, III do not apply signals; the control/timing unit 31 applies a signal so that the AND gates 104, 105, 106 may be closed while the AND gate 107 alone may be opened. The look-up table unit 102 contains color conversion tables of various colors which is utilized for implementing a reproduction of color as precise as possible according to a property of a media sheet on which an image on the liquid crystal cells are to be transferred. The control/timing unit 31 sends a command which color of the look-up tables must be used or a command of timing according to which the contents in the look-up table 102 must be read. 8 bit data from the look-up table 102 is applied to a D/A converting unit 112, where it is converted into an analog data signal and is subjected to a current amplification in the laser diode driving unit 36 to make the laser diode 15 emit light; eventually, it serves as a writing signal for the liquid crystal cells. Each of the liquid crystal cells is divided into three regions as shown in FIG. 1, and erasing circuits 29a, 29b, 29c are provided which are for erasing data in those regions, respectively.

Figure 9:
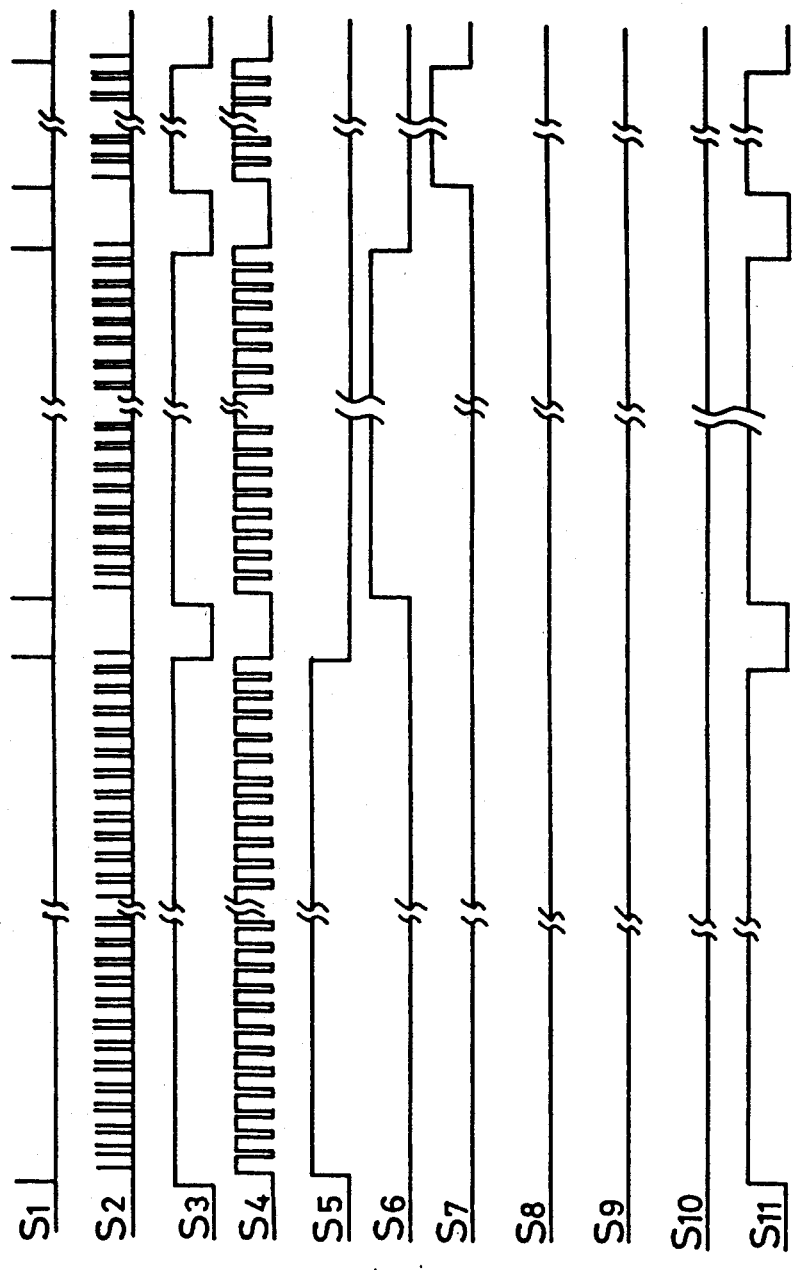
FIGS. 9 to 11 are timing charts showing the operation of writing the image on the liquid crystal cell.
Figure 10:
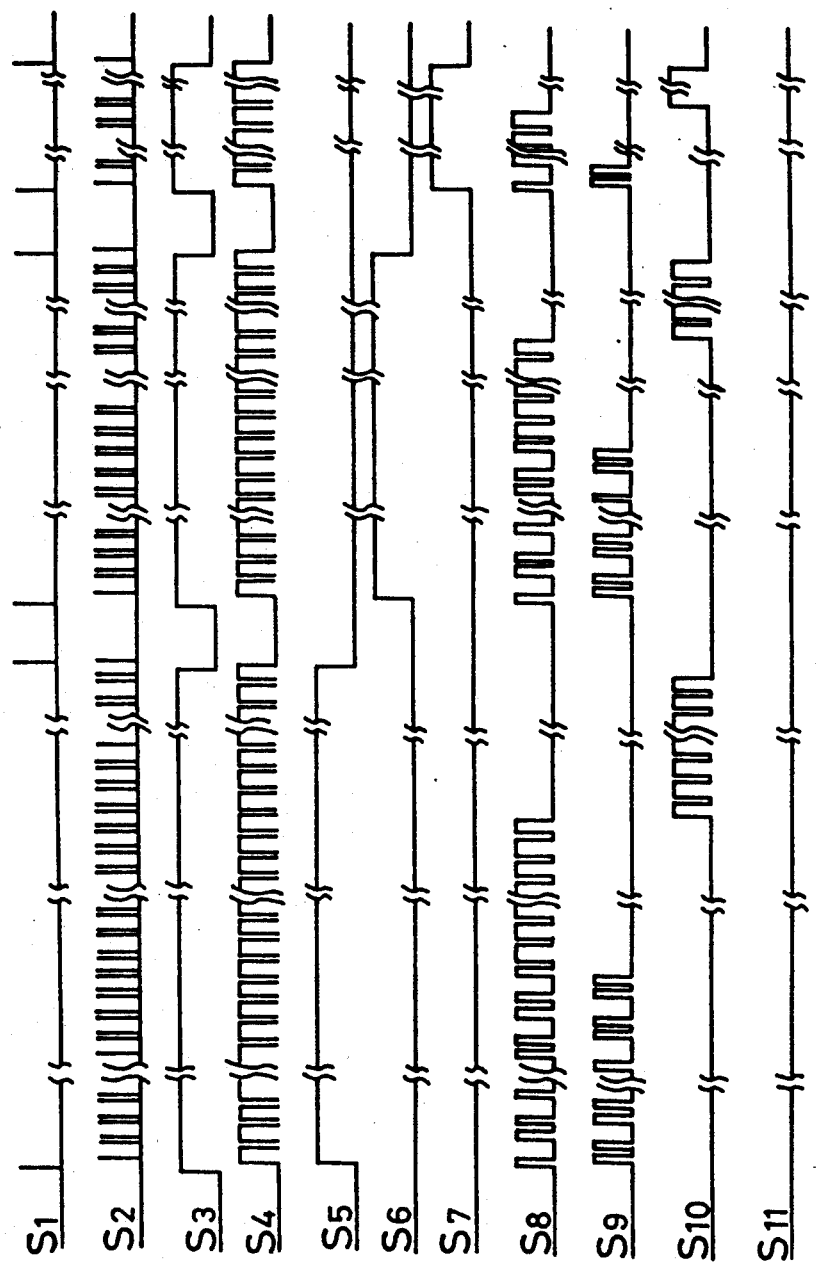
Figure 11:
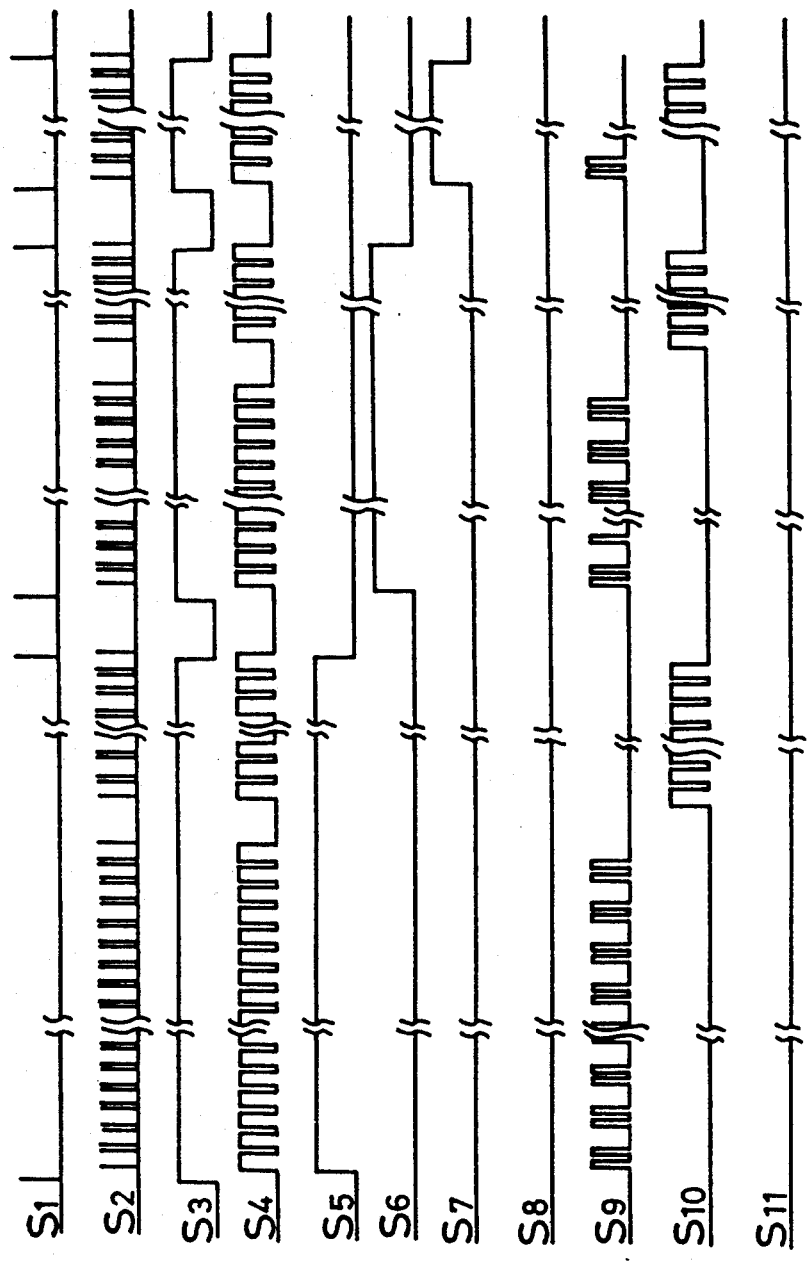

FIGS. 9 to 11 are timing charts for explaining the operation of writing an image in the liquid crystal cells by laser light. FIG. 9 shows a state in which an image throughout the liquid crystal cell are rewritten. In FIG. 9, S1 denotes an X-axis direction data writing position signal outputted when an output of an encoder of the linear encoder motor 28a reaches a specified value. Specifically, the encoder of the linear encoder motor 28a outputs a signal expressing an original point and a 20 bit counter signal expressing a current position; when the liquid crystal cells are moved in the X-axis direction by the linear encoder motor 28a, the signal S1 is outputted each time the liquid crystal cells 11, 12, 13 reach their respective writing start positions and writing end positions. On the other hand, an encoder of the rotary encoder motor 17 outputs a signal expressing an original point and a 19 bit counter signal expressing a current position; an Y-axis direction data writing position signal S2 is outputted when an output of the encoder of the rotary encoder motor 17 reaches a specified value, or when the laser light reaches the boundary between regions 11a and 11b shown in FIG. 7.

An X-direction data writing signal S3 is a gate signal based on the X-axis direction data writing signal S1 while an Y-direction data writing signal S4 is a gate signal based upon the Y-axis direction data writing position signal S2. Output from the laser diode 15 is limited in a range of the gate signal. R, G and B data writing signals S5 to S7 are gate signals expressing a range where each of R data, G data and B data is to be written. Regions I, II and III data writing signals are gate signals expressing a range where data is written in each region. An all-region data writing signal is a gate signal expressing a region where data is written not in a specific region but throughout the liquid crystal cell.

FIG. 10 shows a case where an image is written in all the regions, using regions I, II and III data writing signals S8 to S10 instead of the all-region data writing signal shown in FIG. 9.

FIG. 11 shows a timing chart, for example, for making a basic ID form in which the region II is for a photograph of the person in question and the region III is for remarks on the person.

The region I is not rewritten, and so the linear encoder motor 28a is quickly driven in an area between the regions II and III in the X-direction. This is why there is a break of the data writing signal when writing proceeds from the region II to the region III.

Figure 12:
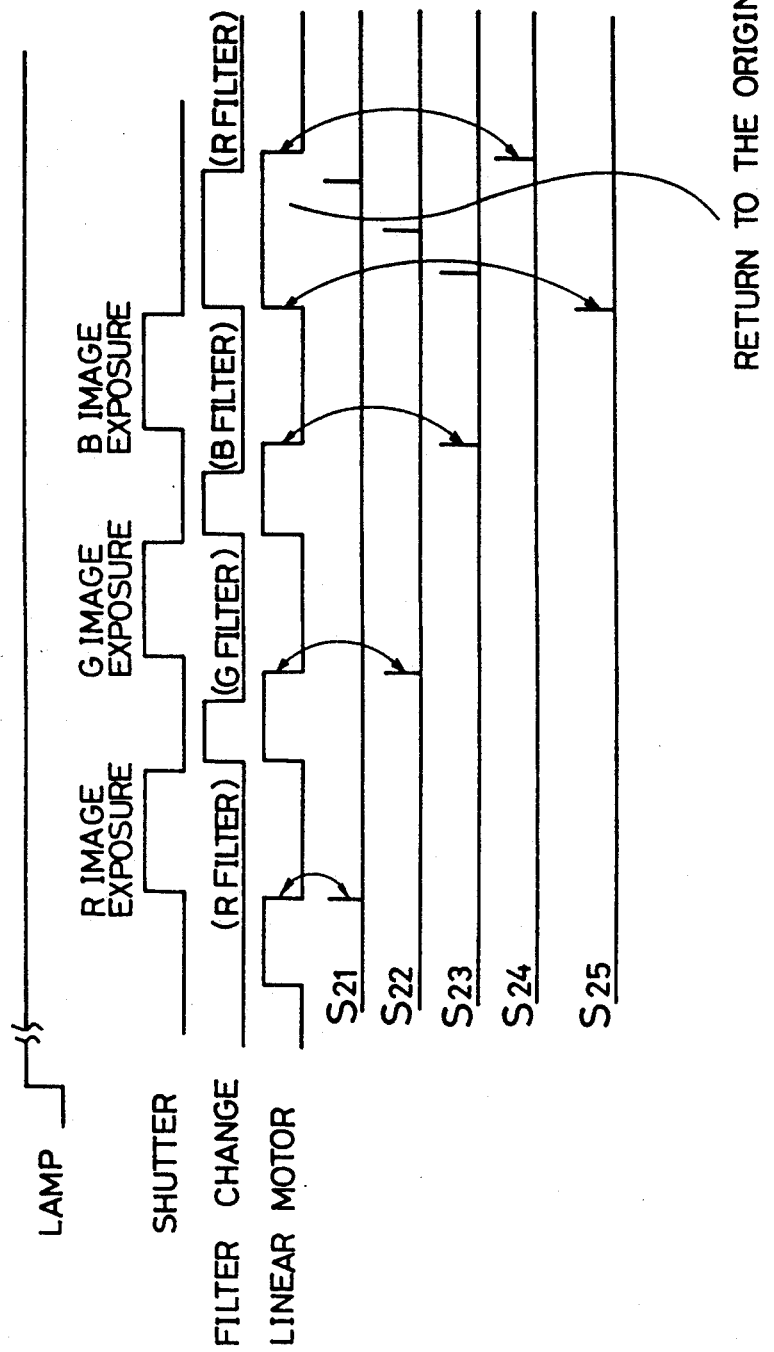
FIG. 12 is a timing chart for explaining the operation of reading the image from the liquid crystal cell.

FIG. 12 is a timing chart for explaining the operation of transferring an image written on the liquid crystal cells onto the photosensitive material 21 through exposure. Referring to FIG. 12, when the writing of an image is completed, the liquid crystal holder 10 is reset in the original position, and then the lamp 18 is turned on to become sufficiently stable.

Then, the linear encoder motor 28a in the X-axis direction is driven to move the liquid crystal supporter 10 from the original position in the X-axis direction, and output from the encoder of the linear encoder motor 28a is counted. When the center of the R image comes in congruity with the optical axis of the lamp 18, the position signal S21 is outputted to open the shutter 19a for a specified period of time. As a result, the R image on the liquid crystal cell is exposed through the R filter plate to light of the lamp 18, and the reflected light is imaged on the photosensitive material 21. When the exposure of the R image to light is completed, the liquid crystal cells move in the X-axis direction while the filter switches to the G filter plate. When the center of the G image comes in congruity with the optical axis of the lamp 18, the signal S22 is outputted to open the shutter 19 for a specified period of time. As a result, the G image is exposed to light. Similarly, when the center of the B image comes in congruity with the optical axis of the lamp 18, the signal S23 is outputted and eventually the B image is exposed to light. When the exposure of the B image to light is completed, san exposure end signal S25 is outputted, and the linear encoder motor 28a makes reverse turnings to move the liquid crystal supporter 10 back to the original position. Then, the signal S24 is outputted. The signals S24, S25 are employed for controlling timing according to which the photosensitive material 21 and the image receiving sheet 25 are sent.

In accordance with this embodiment, partial erasing and partial writing of images can be performed; therefore, image formation can be simplified and attain at high speed.

Embodiment 2

Figure 13:
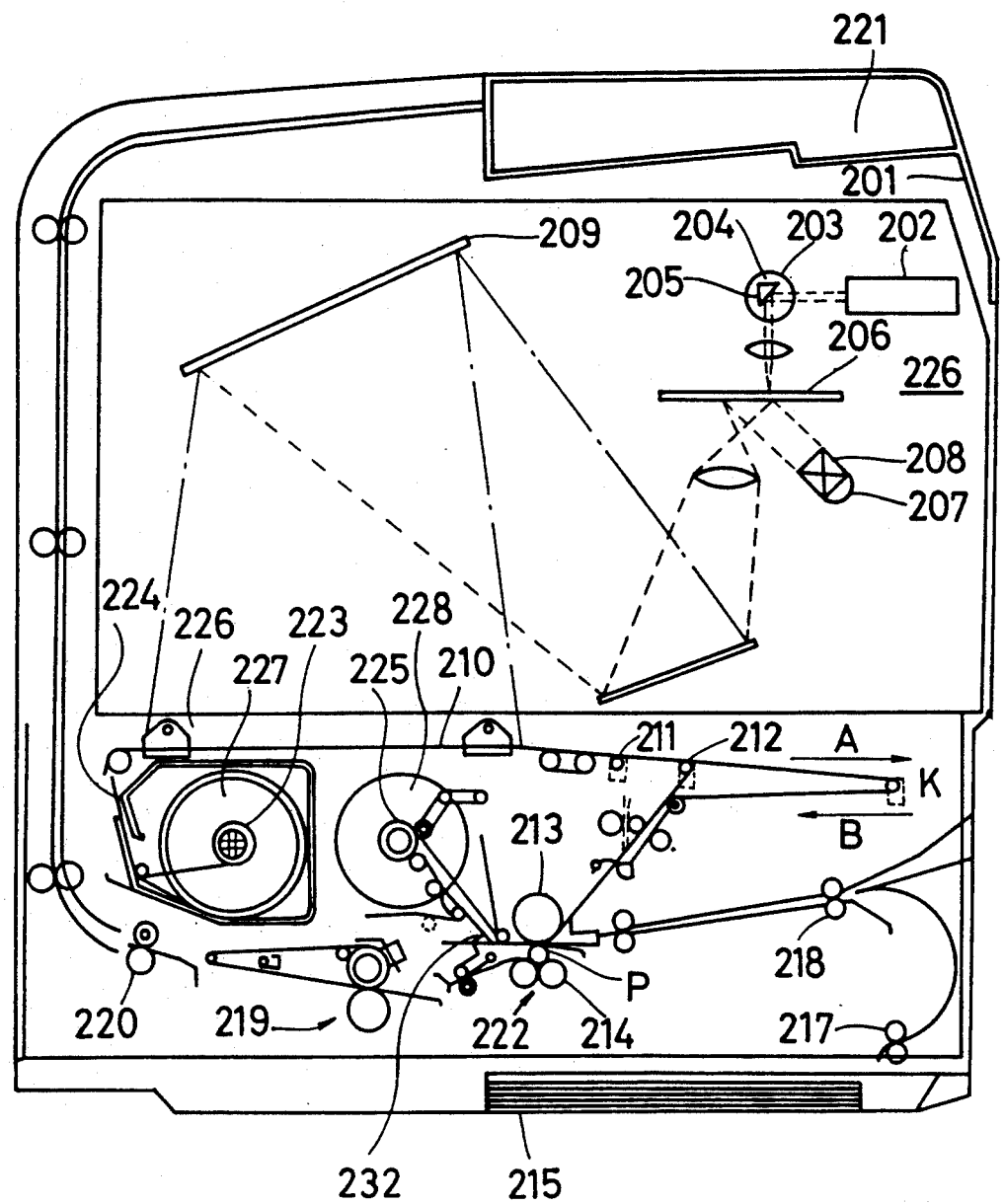
FIG. 13 is a schematic diagram showing a structure of a second embodiment according to the present invention.

FIG. 13 is a schematic view showing a structure of a printer in which a liquid crystal cell functioning as an optical image memory is employed as an intermediate memory for image data. The printer is provided with a semiconductor laser 202, a rotary encoder 203, a motor 204, a primary scanning mirror 205, a liquid crystal cell 206, a lamp 207, and a filter 208 on the upper right of its body 201. On the upper left, a mirror 209 is placed. A media sheet 224 is supplied from a media cassette 226, which is held by a media cassette holder 229 of the body 201. For the liquid crystal cell 206 and the media sheet 224, those which are employed in the previous embodiment can be used.

The media sheet 224 is wound into a roll, a media supply roll 227, inside the media sheet cassette 226, shielded from outside light. On the other hand, the media sheet cassette 226 is provided with a take-up shaft for taking the used media sheet 224, and the used media sheet 224 is wound around the take-up shaft in a roll, a media take-up roll 228. The media supply roll 227 has its center shaft connected to a supply shaft 223 when the media sheet cassette 226 is attached to the body 201. On the other hand, the center shaft of the media take-up roll 228 is connected to a take-up shaft 2225 when the media sheet cassette 226 is attached to the body 201. The media sheet 224 is carried along a path after the media sheet cassette 226 is attached, and then, it is taken up into the media take-up roll 228. Between the media supply roll 227 and the media take-up roll 228 along the path, an exposure plate 210, an automatic carrier roller 211, a buffer roller 212, pressure rollers 213, 214 are disposed. On the lower right a cassette 215 is placed, which is charged with an image receiving sheet 216 coated with developing substance which reacts with various dyes to develop colors and thermalplastic resin. Between the cassette 215 and a pressure developing unit 222 on a path for the image receiving sheet 216, a supply roller 217 and a timing roller 218 are disposed. On the left of the pressure developing unit 222 a lustering device 219 is provided, and on the left of it a paper discharging roller 220 is placed. On top of the body 201, a paper discharging unit 221 is provided.

First, a method of attaching the media sheet will be described.

Upon first treating the printer, and when the media sheet 224 in the media sheet cassette 226 is used up, the media sheet cassette 26 is changed to be loaded with the media sheet 224. After attached to the body 201, the media sheet cassette 226 is loaded with the media sheet 224 through a special operation. To easily perform the operation, the media sheet 224 has an automatic loading sheet 230 at its end, which is slightly harder than the media sheet 224 (FIG. 14).

The user takes out a media cassette holder 229 from the body 201 and the media sheet cassette 226 is put in it. The automatic loading sheet 230 is attached to the automatic carrier roller 211 by a specific means, and thereafter, the media cassette holder 229 is attached to the body 201. After that, pressing operation keys, the media sheet 224 is automatically set in position. The automatic loading operation begins with a movement of the buffer roller 212 to an automatic loading position K so that the automatic loading sheet 230 can be easily pass through.

Then, the automatic carrier roller 211 sends the automatic loading sheet 230 to the pressure developing unit 222. The automatic loading sheet 230 passing between the pressure rollers 213, 214 is sent to the media take-up roll 228 by a media sheet switching plate 232. A strip of adhesive tape is affixed to the media take-up roll 228 to make the automatic loading sheet 230 wind around it; and then, the automatic loading sheet 230 sent close to the roll 228 is caught by the adhesive tape and winds around the media take-up roll 228. At this time, the pressure rollers 213, 214 and the take-up shaft 225 are rotated in the forward direction to help the taking-up of the automatic loading sheet 230. After the automatic loading sheet 230 is wound around the media take-up roll 228, the automatic loading sheet 230 is taken up, and the taking-up of the sheet continues for a specific period of time until the media sheet 224 is set in position. Last, the buffer roller 212 is moved to a home position H. Thus, the automatic setting of the media sheet 224 is completed, and printing operation can start in any time.

Figure 14:
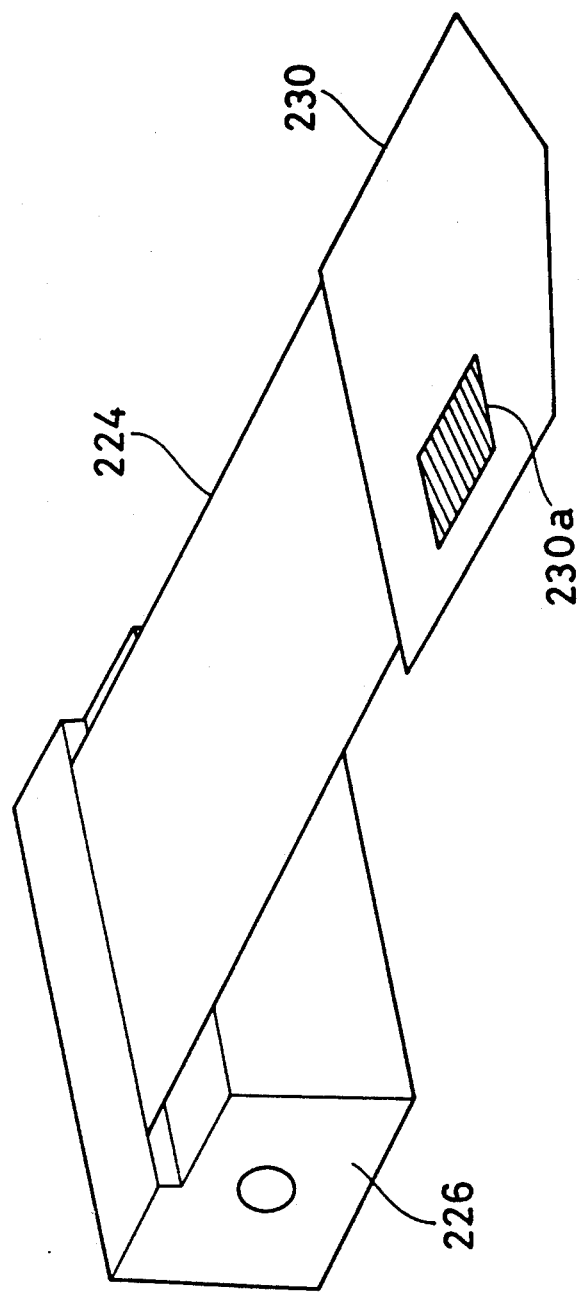
FIG. 14 is a schematic perspective view showing a structure of a media sheet cassette.

The automatic loading sheet 230 contains media information 230a about a photosensitivity of the media sheet 224, lot numbers, and the like, which is printed on it (FIG. 14). The information is read by a photosensor upon the automatic loading, and it is stored as media information in a non-voratile memory (EEPROM or the like).

Figure 15:
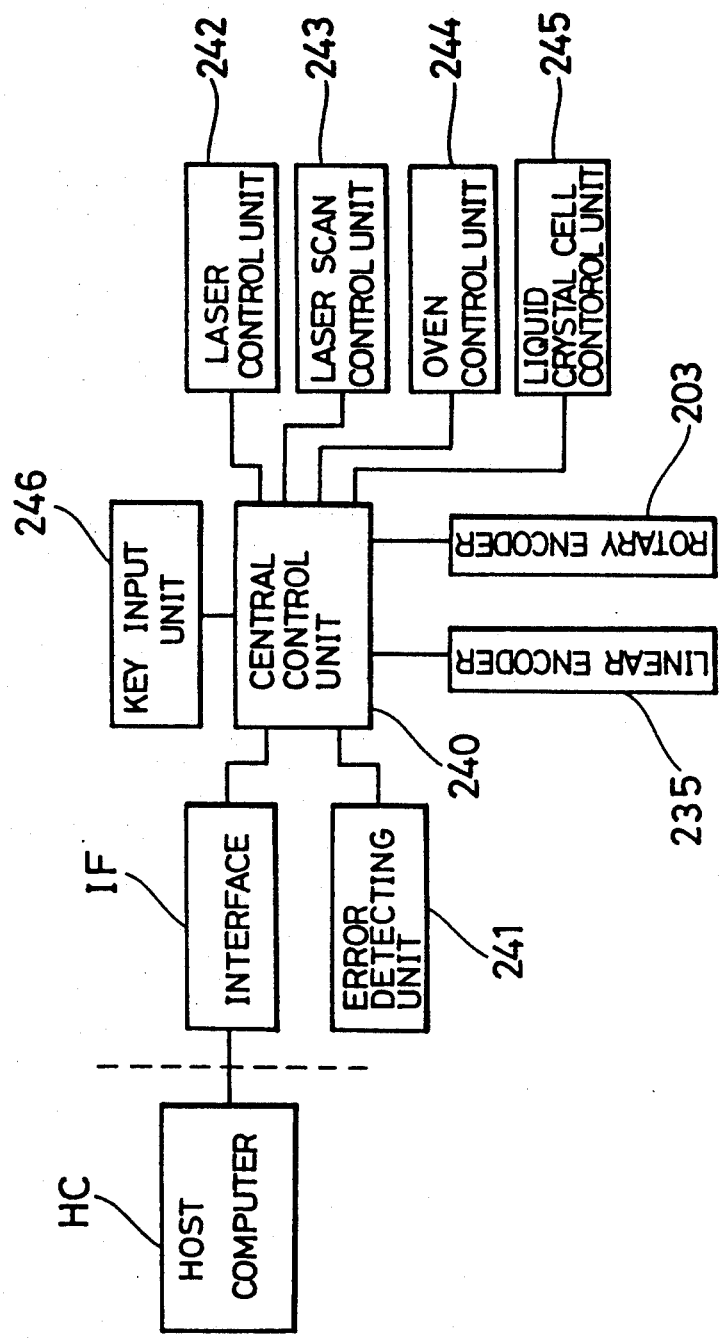
FIG. 15 is a block diagram showing a structure of a control mechanism of the second embodiment.

FIG. 15 shows a structure of a control mechanism of this embodiment.

In FIG. 15, an interface IF receives image data from the host computer and applies signals to a central control unit 240 composed of a microcomputer, ROM, RAM and an input/output circuit. An error detecting unit 241 for detecting an error, such as paper jam, leaving the body 201 open, and the like, is connected to the central control unit 240, and moreover, a laser control unit 242 for controlling a semiconductor laser 202, a laser scan control unit 243 for controlling laser beam, an oven control unit 244 for controlling an oven which keeps the liquid crystal cell 206 under constant temperature, a liquid crystal cell control unit 245 for controlling writing and erasing in and from the liquid crystal cell 206, and a key input unit 246 including a display device are connected to the same. Control means is composed of the central control unit 240 while writing means is composed of the central control unit 240, the semiconductor laser 202, the laser control unit 242, and the laser scan control unit 243. The central control unit 240 and the laser control unit 242 also serve as erasing means. Moreover, position confirming means is composed of the rotary encoder 203, the linear encoder 235 and the central control unit 240. Then, the image formation operation will be explained.

Image data transmitted from the host computer HC is applied to the interface IF of the printer and then sent to the central control unit 240. The central processing unit 240 correct data in accordance with the image data transmitted and allowing for a photosensitivity of the media sheet 224. In accordance with the corrected data, the laser control unit 242 oscillates the semiconductor laser 202. Laser beam emitted by the oscillation of the semiconductor laser 202 is reflected by the primary scanning mirror 205 attached to a shaft of the motor 204, and its movement is controlled by the laser scan control unit 243 in accordance with a signal from the rotary encoder 203. Timing for the oscillation of the semiconductor laser 202 is controlled according to an output of the rotary encoder 203 not so as to easily cause a deviation of the target.

Figure 16:
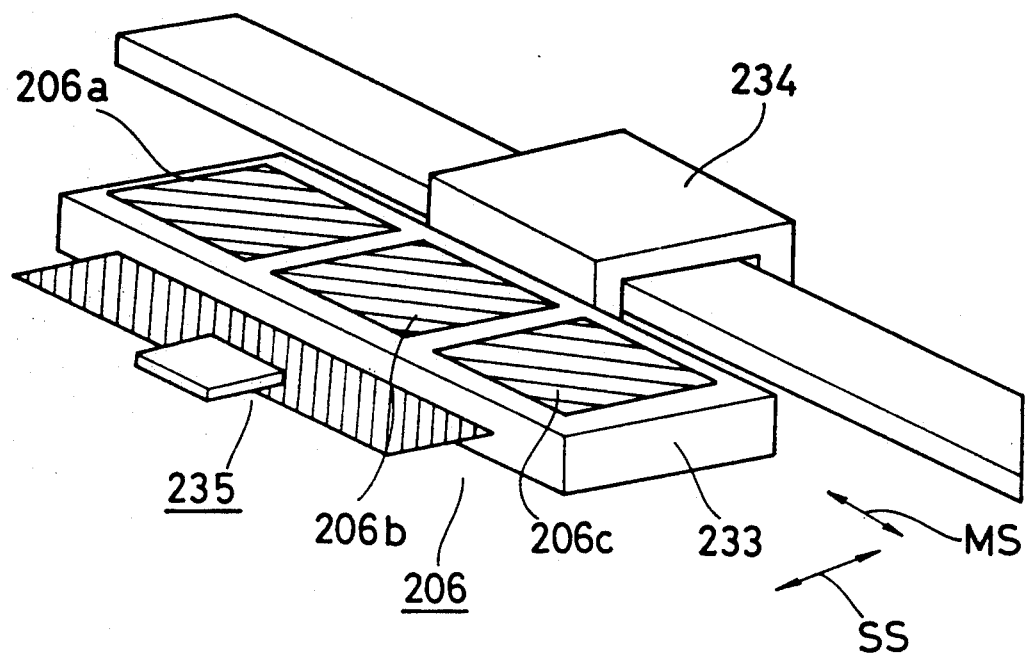
FIG. 16 is a schematic perspective view showing a structure of a liquid crystal cell of the second embodiment.

On the other hand, the liquid crystal cell 206 it self is attached to a carrier 233, as shown in FIG. 16, and it is moved by a linear motor 234 in a secondary scanning direction SS. The movement of the linear motor 234 is controlled by a linear encoder 235. In accordance with signals from the rotary encoder 203 and linear encoder 234, the target position on the liquid crystal cell 206 can be specified, and required information can be written. There are three of the liquid crystal cells 206, which are allocated to screens for red, green and blue if color print is intended. Then, image data is written by the semiconductor laser 202.

When the image data is read out, a lamp 207 illuminates the liquid crystal cells 206 through filters 208, and reflected light from the liquid crystal cell 206 illuminates the media sheet 224. There are three types of the filters 208, red, green and blue, through which the light from the lamp 207 illuminates the liquid crystal cells 206, respectively, and is reflected. A period of time for which the lamp 207 illuminates is determined by controlling a period of time for which a shutter 236 opens so as to vary a color balance in printing.

The reflected lights of red, green and blue are reflected by a mirror 209 and illuminate the media sheet 224 on an exposure plate 210; thus, the media sheet 224 is exposed. Assuming an area exposed to light on the media sheet 224 is denoted by X, an amount of the media sheet 224 used at a time is evaluated as a length of the exposed area X plus a distance Y between images. Because of the exposure to light, a selective hardened latent image is formed on the media sheet 224. The stages after this are different between multi-printing and single-printing. An example of the single printing will be explained.

When the exposure to light is completed, the buffer roller 212 is moved in an A direction to send the unused media sheet 224 to the exposed region X. Then, a take-up shaft 2255 is rotated, and at the same time, the buffer roller 212 is moved in a B direction to the home position H so that the end of the region where the selective hardened latent image is formed is carried to a pressure developing point P. On the other hand, the image receiving sheet 216 is drawn out of the cassette 215 one after another and guided by the supply roller 217 to the timing roller 218, where the sheet halts and stays still.

Then, the buffer roller 212 is moved in the A direction to send the unused media sheet 224 to the exposed region X. After the buffer roller 212 begins to move in the B direction, the image receiving sheet 216 on standby at the timing roller 218 is sent to the pressure developing point P in synchronization with the initial end of the selective hardened latent image. The media sheet 224 and the image receiving sheet 216 are superposed upon each other just before the pressure point P, and they together are sent to the pressure point P. The media sheet 224 superposed on the image receiving sheet 216 is pressed by the pressure rollers 213, 214 at the point where the initial end of the image receiving sheet 216 somewhat pass the pressure point P, and under the pressing condition, the pressure rollers 213, 214 are rotated in the forward direction to send the media sheet 224 and the image receiving sheet 216.

This causes microcapsules not hardened on the media sheet 224 to crash and discharge a dye, and it reacts with the developing substance laid on the image receiving sheet 216 to develop color. The pressing by the pressure rollers 213, 214 are performed just before the terminal end of the image receiving sheet 216. The media sheet 224 which has been subjected to the pressure development is taken up by the take-up shaft 225 while the image receiving sheet 216 is subjected to a heat treatment in the lustering device 219, guided upwards by the paper discharging roller 220 and discharged into the paper discharging unit 221.

On the other hand, when the pressure development is completed, an unused media sheet is sent near the pressure point P. Exposure operation is carried out at once, the distance Y between images becomes undesirably large; this is a waste of the media sheet. Then, the supply shaft 223 and the take-up shaft 225 are reversely rotated to move the media sheet near the exposure area X. These are all for the image formation procedure for the single printing by the full color printer. These sequential steps enable image data transferred from the host computer to be printed.

Figure 17:
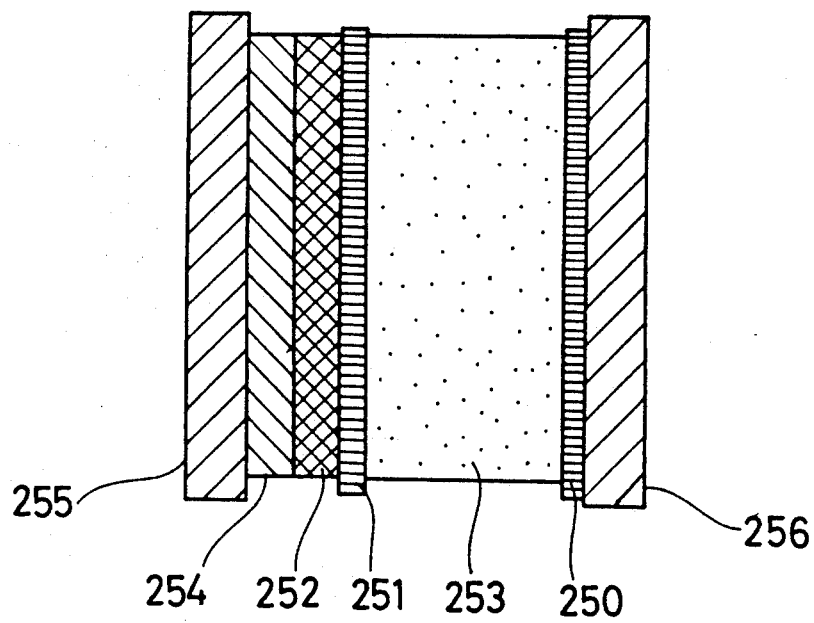
FIG. 17 is a schematic cross-sectional view showing a structure of the liquid crystal cell of the second embodiment.

Then, a method of writing/erasing on and from the liquid crystal cell 206 will be described. FIG. 17 is a schematic view showing a structure of the liquid crystal cell 206.

The liquid crystal cell 206 is composed of two glass layers 255, 256, a transparent electrode 250 provided inside the glass layer 256, an anti-reflection film 254 provided inside the glass layer 255, a laser absorbing film 252 deposited on the anti-reflection film 254, an electrode 252 deposited on the laser absorbing film 252 for serving as an mirror, and liquid crystal 253 charged between the transparent electrode 250 and the electrode 251.

The liquid crystal cell 206 is kept under constant temperature of 50 !n in an oven (not shown) so as to easily cause phase transition. When image data is written, voltage is applied to the electrode 250 shown in FIG. 17 to set the direction of the phase transition. Then, laser light from the semiconductor laser 202 illuminates the liquid crystal cell 206 from the backward. The laser light is absorbed in the laser absorbing film 252 and turns to heat, and consequently, the temperature of the liquid crystal is raised in a range in proportion to an energy of the applied laser light. In other words, only the part which the laser light irradiates becomes higher in temperature. While the whole liquid crystal cell 206 is kept at 50 !n which is the critical temperature to the phase transition, the temperature rises in a range in proportion to an energy of the laser light applied only to the part which the laser light irradiates, and the applied voltage causes the phase transition at that part to turn the part opaque.

Thus, an amount of the liquid crystal 253 which turns to opaque can be varied by changing the energy of the applied laser light, and gradation can be produced in each pixel. In this embodiment, an energy applied to the liquid crystal 253 is varied by changing a pulse width of the laser light in each pixel to produce gradation. That is all for the procedure of writing image data to the liquid crystal cell 206.

Then, the erasing of the image data stored in the liquid crystal cell 206 will be explained. In order to erase the image data on the liquid crystal cell 206 in the unit of liquid crystal, the voltage applied to the liquid crystal may be a value for erasing. The value of the applied voltage required for erasing varies from a structure of the liquid crystal to another, and generally, voltage about two times as much as the applied voltage required in writing may be applied.

The above-mentioned sequential steps are steps when the image processing operation is not performed on the liquid crystal cell 206. The case where the image processing operation is performed on the liquid crystal cell 206 will be described below.

As previously mentioned, in the writing of data in the liquid crystal cell 206, the position where the data is to be written can be confirmed in accordance with a signal of the rotary encoder 203 connected to the primary scanning mirror 205 with regard to the primary scanning direction. On the other hand, with regard to the secondary scanning direction, the position of the carriage 233 attached to the liquid crystal cell 206 can be confirmed by the linear encoder 235.

Thus, positions on the liquid crystal cell 206 can be 203 and linear encoder 235.

Figure 18:
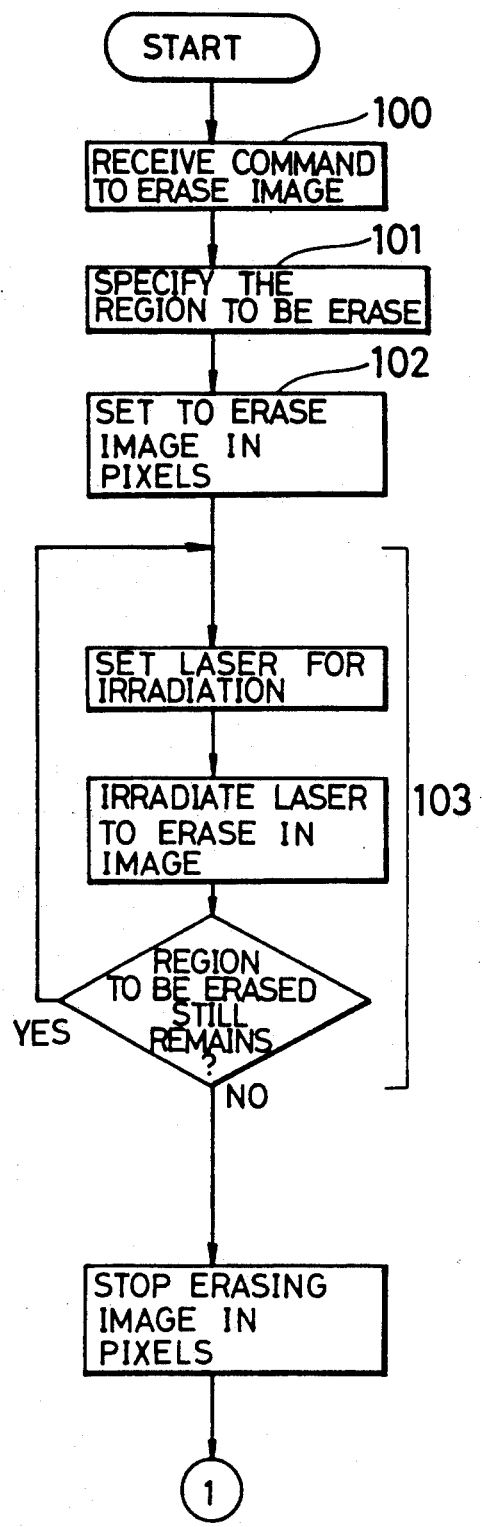
FIGS. 18 and 19 are flow charts showing the operation of the second embodiment.
Figure 19:
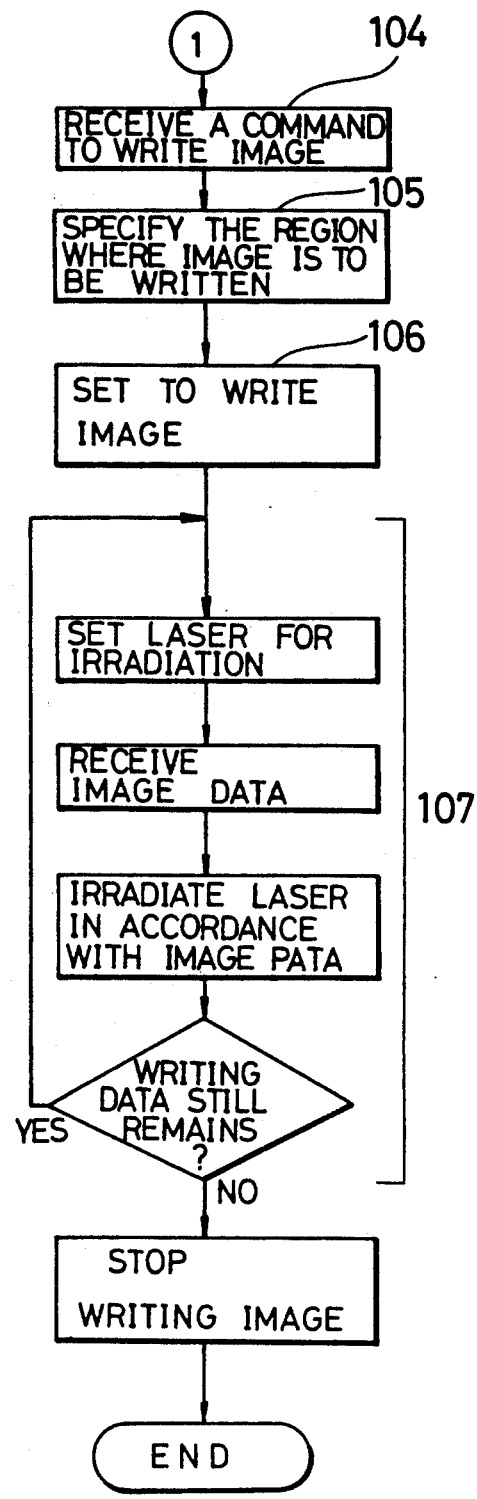
Figure 20:
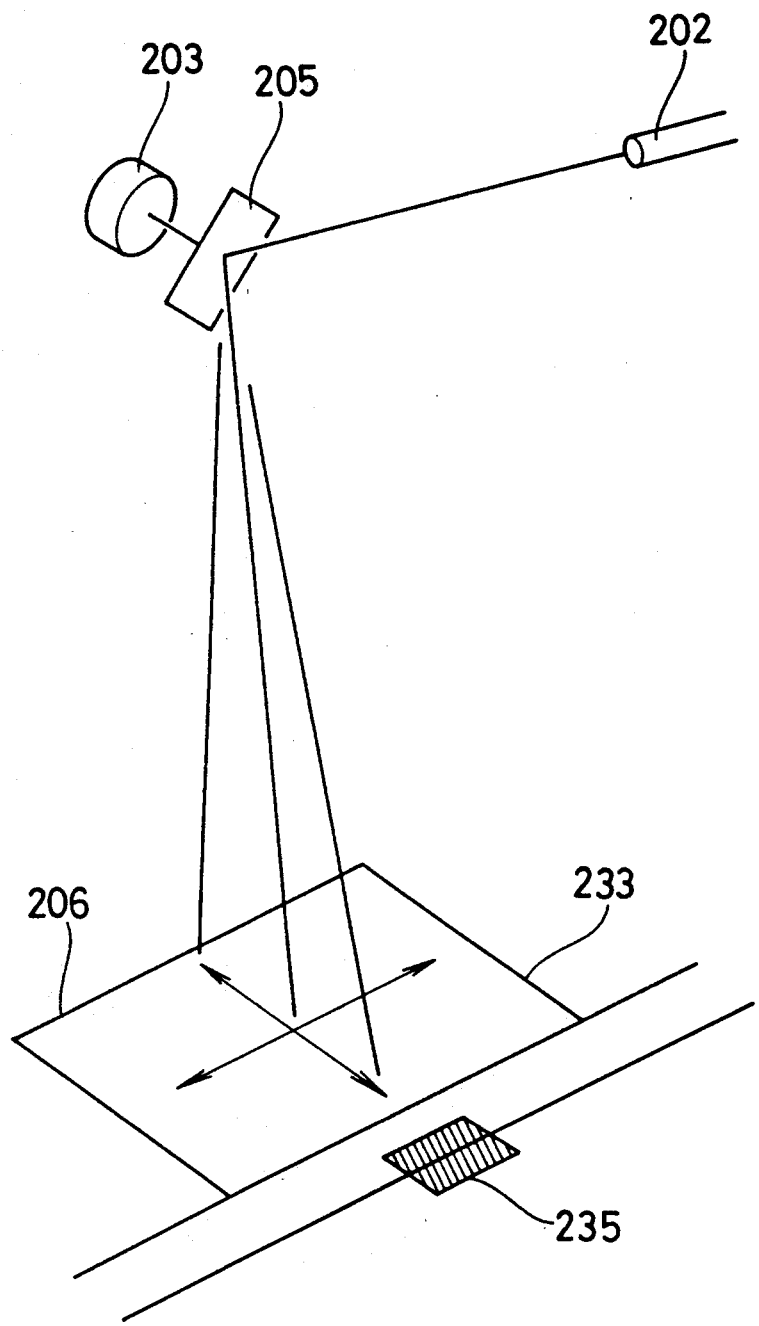
FIG. 20 is a perspective view showing the positional relation between the liquid crystal cell and laser light of the second embodiment.

Then, with reference to flow charts shown in FIGS. 18 and 19, erasing and rewriting of an image from and on the liquid crystal cell 206.

When a command to erase an image on a specified region is given by the host computer HC (step 100), the central control unit 240 receives the command from the interface IF, and it uses the rotary encoder 203 and the linear encoder 235 to specify the area to be erased (step 101). After that, the liquid crystal cell control unit 245 is set to erase an image in pixels (step 102). Then, the central control unit 240 makes the laser control unit 242 and the laser scan control unit 243 direct laser to the region specified by the host computer HC to raise a temperature of part of the liquid crystal (or in pixels) (step 103). The liquid crystal becomes opaque because of the temperature rising by the irradiation of laser in writing data, but the liquid crystal can be transparent by the laser irradiation depending upon the voltage applied to the liquid crystal. This means that the temperature rising by the laser irradiation is merely an insubstantial cause of the phase transition but it depends on the voltage applied to the liquid crystal which direction the phase transition of the liquid crystal is caused by the laser irradiation (whether it turns opaque or transparent).

According to the above means, an image on the liquid crystal can be erased. When a command to write an image on a specified region is given by the host computer HC (step 104), the central control unit 240 receives the command from the interface IF, and it uses the rotary encoder 203 and the linear encoder 235 to specify the region where data is to be written (FIG. 19) (step 105).

After that, the liquid crystal cell control unit 245 is set to write an image (step 106).

Then, the central control unit 240 makes the laser control unit 242 and the laser scan control unit 243 write an image in accordance with the image data on the specified region transferred from the host computer HC (step 107).

According to the above procedure, image processing utilizing image data already written on the liquid crystal cell, erasing and writing an image, can be performed.

With the above-mentioned printer, when there is caused an error for which the operator of the printer must open the case of the printer while image data transmitted from the host computer is being written on a plurality of liquid crystal cells one after another; for example, when paper jam is caused or when the operator makes an error of opening the case, a heater of an oven containing the liquid crystal cells, a laser and the like are turned off to avoid danger. When such an error is caused, the writing of the image data on the liquid crystal cells are interrupted. At this time, no physical defect is caused in the liquid crystal cells, but the reliability of the image data which has been written is lost.

Figure 21:
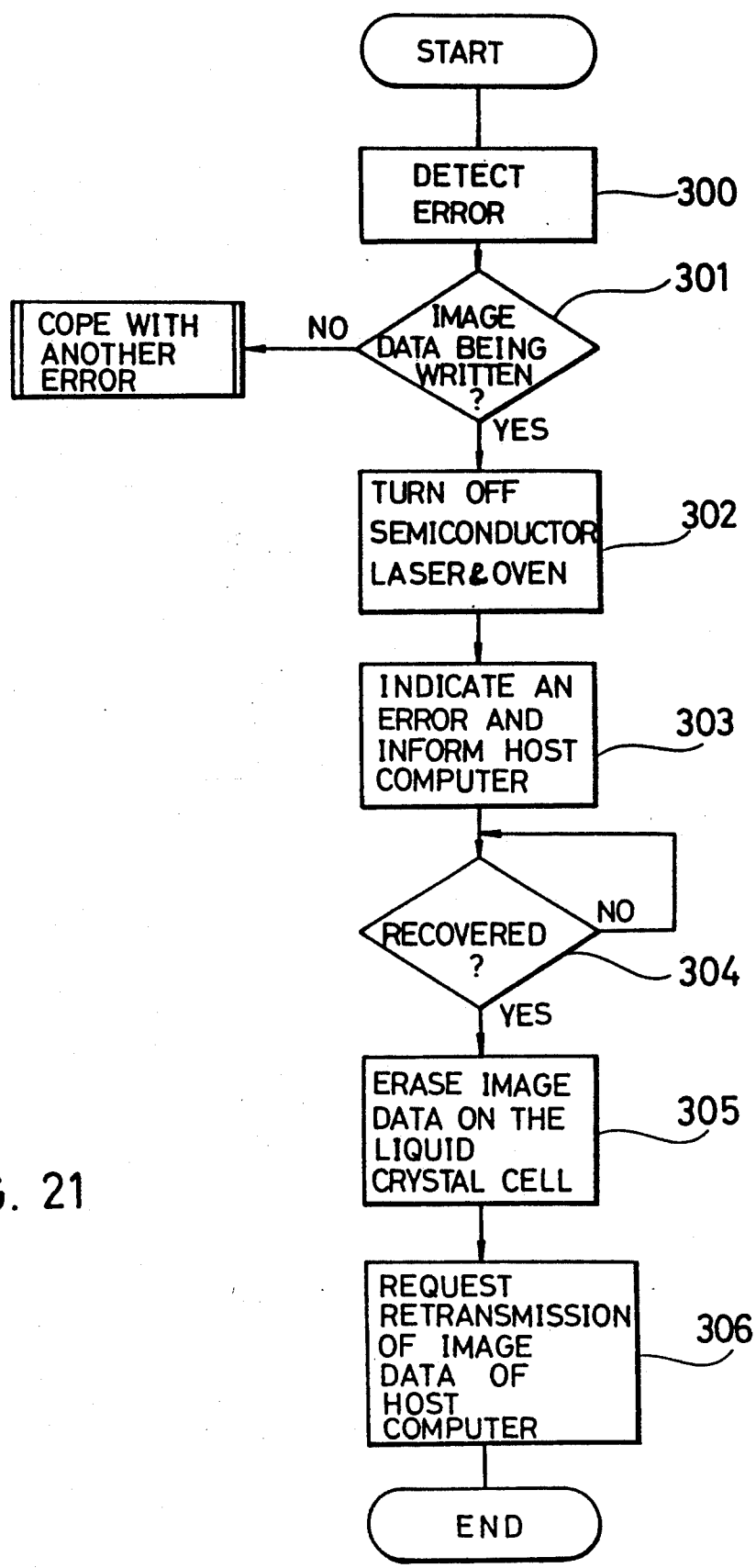
FIG. 21 is a flow chart showing the operation when an error is caused in the second embodiment.

Therefore, all the image data on the plurality of the liquid crystal cells may be erased indifferent of which liquid crystal cell an error is caused in while the image data is being written, and instructions are given to the host computer to transmit all the image data. In this case, however, it is necessary to transmit once more the image data already transmitted by the host computer, or the image data formed on the liquid crystal cells. This leads to an increase in a time for which the host computer is occupied by the printer, and also leads to a reduction of throughput of the printer. Then, to overcome the drawbacks, the printer works as mentioned below. As for an error caused after the transmission of the image data from the host computer HC is completed, there arises no special problem because the image data has been already stored on the liquid crystal cell 206. On the other hand, as for an error caused while the image data is being transmitted from the host computer, reliability of the image data becomes a problem. FIG. 21 shows the operation in this case in a flow chart.

First, assume that an error is caused in the middle writing in a liquid crystal cell 106b after writing in a liquid crystal cell 206a.

When the error detecting unit 241 detects an error (step 300), the central control unit 240 judges whether image data is being written (step 301). If so, the semiconductor laser 202 and the oven are turned off (step 302). Then, an error is indicated by an indicator of a key input unit, and it is informed of the host computer HC that the error is caused (step 303).

Then, it is judged whether the cause of the error is eliminated (step 304), and if so, the image data on the liquid crystal cell 6b is erased (step 305).

The erasing begins with confirming the position where the writing is performed in the liquid crystal cell when the error is caused, in accordance with signals from the rotary encoder 203 and the linear encoder 234. When the central control unit 240 confirms the position, the liquid crystal cell control unit 245 applies voltage to the liquid crystal cell (liquid crystal cell 206b herein) for a specified period of time.

After that, a value of the applied voltage is varied to make a state in which the image data can be written. The central control unit 240 applies a signal through the interface IF to the host computer HC to request that the host computer HC should transmit the image data once more (step 306). In this case, the data retransmission requesting signal includes data indicating the position confirmed when an error is caused, or a parameter indicating which liquid crystal cell the image data should first be transmitted again.

With the above-mentioned procedure, there is no need of transmitting the image data already written on the liquid crystal cells once more, a time for which the printer occupies the host computer can be shortened when an error is caused, and a reduction of the throughout when an error is caused can be decreased.

Moreover, as mentioned below, the image data stored in the liquid crystal cell can be erased in each line in the primary scanning direction.

Specifically, when an error is detected in writing image data in one of the liquid crystal cells (206b), the semiconductor laser 202 and the over are turned off, and the occurrence of the error is indicated. The occurrence of the error is informed of the host computer HC, and the image data is erased after the cause of the error is eliminated.

Upon the erasing, voltage is applied to the transparent electrode 250 of the liquid crystal cell 206b in a different polarity from that of the voltage applied when the image data is written, and energy is applied by laser beam, so that in the liquid crystal 253 the reverse phase transition is caused to that in the writing and opaque part is erased. While erasing can be carried out in each pixel, herein it is intended that a deviation of the position between the image data to be written and that to be erased be a minimum. For the purpose, and allowing for the boundary of the image data, the initial portion in the primary scanning direction is erased; that is, the image data is erased in a single line.

A single line to be erased corresponds to a single line in the primary scanning direction, including the position confirmed in accordance with signals from the rotary encoder 203 and the linear encoder 234. In this embodiment, also, the data transmission requesting signal after an error is caused has a parameter indicating which part of which liquid crystal cell the image data should first be transmitted again.

The optical image memory may be any memory storing an image which is recognizable when light is irradiated and can always be read without a bit of difference even if the irradiation is repetitively performed (unless erasing is performed). For example, a memory, which is distinguished from a photoconductor drum in an ordinary copying machine, may be made of liquid crystal, electrochromy, PLZT (a compound of Pb, La, Zr, and Ti) and the like.

According to this embodiment, a period of time required for writing image data in an optical image memory once more when an error is caused can be shortened. In other wards, it is not necessary for the host computer to first transmit image data, so it is not necessary to transmit the image data already written in the optical image memory once more; therefore, a period of time for transmitting data can be shortened. Thus, an increase in a time for which the host computer is occupied by the printer can be prevented, and the reduction of the throughput of the printer can be prevented.

What is claimed is:

1. An image formation device comprising:
   writing means for selectively writing image data on a liquid crystal cell by a beam of light;
   a printer for printing out an image from the liquid crystal cell onto a recording medium;
   a transparent electrode divided into a plurality of segments and provided on the cell; and
   erasing means for applying an erasing voltage to the liquid crystal cell through an electrode segment to partially erase written image data so that the writing means selectively rewrites the image data of an erased region.

2. An image formation device comprising:
   an optical image memory capable of storing image data which is optically recognizable and can be repetitively read;
   writing means for writing image data in the optical image memory by a beam of light;
   confirming means for confirming where the image data written by the writing means is located in the optical image memory;
   erasing means for erasing at least a part of the image data already written; and
   control means for controlling the writing means for writing the image data erased by the erasing means once more in the optical image memory;
   wherein the optical image memory is composed of at least a single liquid crystal cell which can store image data in bits, while the erasing means is composed of voltage applying means for applying voltage to the liquid crystal cell so that only the image data which corresponds to a single scanning line, including the data in the position confirmed by the confirming means, may be erased from the liquid crystal cell.

3. An image formation device comprising:
   an optical image memory capable of storing image data which is optically recognizable and can be repetitively read;

writing means for writing image data in the optical image memory by a beam of light;

error detecting means for detecting an error caused while the writing means is operating;

confirming means for confirming where the image data is written in the optical image memory by the writing means when the detecting means detects the error;

erasing means for erasing at least a part of the image data written as far as a position confirmed by the confirming means; and control means for stopping the operation of the writing means when the error detecting means detects the error and for controlling the writing means so that the image data erased by the erasing means may be written once more in the optical image memory.

4. A device according to claim 3, wherein the optical image memory is composed of a plurality of liquid crystal cells which can store image data in bits, while the erasing means is composed of voltage applying means for applying voltage to the liquid crystal cells so that only the image data which corresponds to a single scanning line, including the data in the position confirmed by the confirming means, may be erased from the liquid crystal cells in which image data is being written when the error is detected.

* * * * *